(12) United States Patent
Green

(10) Patent No.: US 9,558,428 B1
(45) Date of Patent: Jan. 31, 2017

(54) INDUCTIVE IMAGE EDITING BASED ON LEARNED STYLISTIC PREFERENCES

(71) Applicant: Samuel B. Green, Albuquerque, NM (US)

(72) Inventor: Samuel B. Green, Albuquerque, NM (US)

( * ) Notice: Subject to any disclaimer, the term of this patent is extended or adjusted under 35 U.S.C. 154(b) by 118 days.

(21) Appl. No.: 14/335,871

(22) Filed: Jul. 18, 2014

(51) Int. Cl.
| | |
|---|---|
| G06K 9/46 | (2006.01) |
| G06K 9/62 | (2006.01) |
| G06K 9/40 | (2006.01) |
| G06K 9/00 | (2006.01) |
| G06K 9/03 | (2006.01) |

(52) U.S. Cl.
CPC ......... *G06K 9/6255* (2013.01); *G06K 9/00523* (2013.01); *G06K 9/00536* (2013.01); *G06K 9/03* (2013.01)

(58) Field of Classification Search
USPC ........................................ 382/190, 155, 254
See application file for complete search history.

(56) References Cited

U.S. PATENT DOCUMENTS

| | | | | |
|---|---|---|---|---|
| 5,579,445 A * | 11/1996 | Loce | .......................... | G06T 3/40 358/1.2 |
| 6,301,440 B1 * | 10/2001 | Bolle | ................. | G06K 9/00664 348/229.1 |
| 6,963,360 B1 | 11/2005 | Esquibel et al. | | |
| 7,142,225 B1 * | 11/2006 | Boler | ....................... | G06T 11/60 345/566 |
| 7,197,158 B2 * | 3/2007 | Camara | ............. | G06F 17/30265 348/231.3 |
| 7,359,572 B2 * | 4/2008 | Liu | .......................... | G06T 5/009 345/589 |
| 7,555,148 B1 * | 6/2009 | Steinberg | .......... | G06F 17/30247 340/5.53 |
| 7,826,680 B2 * | 11/2010 | Neal | ...................... | H04N 5/202 382/274 |
| 7,869,089 B2 * | 1/2011 | Horita | ...................... | B41M 1/14 358/1.9 |
| 8,508,622 B1 * | 8/2013 | Anon | ................... | H04N 5/2621 348/222.1 |
| 8,666,148 B2 * | 3/2014 | Paris | ....................... | G06K 9/62 382/100 |
| 8,854,491 B2 * | 10/2014 | Ford | .................. | H04N 5/23219 348/211.3 |

(Continued)

OTHER PUBLICATIONS

Bychkovsky, Vladimir Leonid, Enhancement and stylization of photographs, PhD Thesis at the Massachusetts Institute of Technology, Jun. 2013, 95 pages, accessed at: https://people.csail.mit.edu/vladb/thesis.pdf.

(Continued)

*Primary Examiner* — Kathleen Y Dulaney
(74) *Attorney, Agent, or Firm* — Olivia J. Tsai

(57) ABSTRACT

An automatic image editing system is a sophisticated and intelligent computer-based image editing system that automatically applies edits to attributes of captured images in accordance with the preferences and editing style of any given user. The system initially learns a user's image editing style with examples of user-edited images. The system continues to learn or adjust to the user's evolving image editing style through feedback of subsequent manual edits by the user to attributes of computer implemented automatically edited images.

18 Claims, 9 Drawing Sheets

(56) References Cited

U.S. PATENT DOCUMENTS

| | | | | |
|---|---|---|---|---|
| 8,913,827 B1* | 12/2014 | Fang | ............... | G06T 11/001 |
| | | | | 382/162 |
| 2003/0185457 A1* | 10/2003 | Campbell | ............ | G06T 5/009 |
| | | | | 382/254 |
| 2004/0258308 A1* | 12/2004 | Sadovsky | ......... | H04N 1/32128 |
| | | | | 382/190 |
| 2007/0110305 A1* | 5/2007 | Corcoran | .......... | G06K 9/00228 |
| | | | | 382/167 |
| 2007/0154084 A1* | 7/2007 | Kang | ................ | H04N 1/6052 |
| | | | | 382/162 |
| 2008/0252938 A1* | 10/2008 | Cazier | ............... | H04N 1/387 |
| | | | | 358/450 |
| 2008/0317378 A1* | 12/2008 | Steinberg | ............. | G06T 5/50 |
| | | | | 382/275 |
| 2008/0317379 A1* | 12/2008 | Steinberg | .......... | G06K 9/00248 |
| | | | | 382/275 |
| 2010/0054544 A1 | 3/2010 | Arguelles | | |
| 2010/0067783 A1* | 3/2010 | Horita | ............... | H04N 1/6033 |
| | | | | 382/162 |
| 2010/0302272 A1* | 12/2010 | Reid | ................ | G06K 9/00234 |
| | | | | 345/591 |
| 2013/0121566 A1* | 5/2013 | Paris | ................ | G06T 11/001 |
| | | | | 382/159 |
| 2015/0098646 A1* | 4/2015 | Paris | ................ | G06T 5/00 |
| | | | | 382/159 |
| 2015/0178965 A1* | 6/2015 | Edwin | ............... | G06F 3/04845 |
| | | | | 382/311 |

OTHER PUBLICATIONS

Simone Bianco et al., Improving Color Constancy Using Indoor-Outdoor Image Classification, IEEE Transactions on Image Processing, Dec. 2008, pp. 2381-2392, vol. 17, No. 12.

* cited by examiner

GUI FIGURE: TRAINING MODE

GUI FIGURE: USE MODE

INDUCTIVE IMAGE EDITING BASED ON LEARNED STYLISTIC PREFERENCES

FIELD

Embodiments of the invention relate to the field of image editing and, more specifically, to computer-based automatic editing of photographic images.

BACKGROUND

In the photography field, in particular professional photography, photographers take photos with a camera and subsequently edit the resulting images on a computer with an image editing program. These edits are intended to enhance the images so that they become more visually appealing. How a particular photographer chooses to edit his photos will vary based on personal preference and style, and can include adjustments of attributes such as temperature, tint, and exposure of the photographic image. A myriad of attributes are adjustable by existing image editing programs in the current state of the art. For example, one photographer might utilize an image editing program to adjust his images to be more warm while another photographer might adjust his images to be more cool. In another example, some photographers prefer the blacks crushed in his photographs, meaning that the images appear more contrasting and sharp, while other photographers prefer soft blacks, meaning that the images appear more hazy.

With an image open and in view in an image editing program, the photographer would typically move a sliding scale tied to an attribute he wishes to alter and the program applies a corresponding change of that attribute to the image in real time. The photographer proceeds to adjust, in the same image, multiple attributes to varying degrees. Going through at least hundreds of images comprised in just one standard photoshoot to select and properly adjust them is a time-consuming and meticulous task, even for a seasoned photographer.

Some offerings are available in the status quo that may appear to assist photographers in the editing process. One is referred to as presets or filters, which are a canned set of adjustments that can be applied to an image. For instance, one preset is a "warm" preset that, with the click of a button, can adjust the appearance of an image to be more warm. Another preset is a "cool" preset that, when selected, will make an image appear more cool. However, these presets generally are directed to a set of fixed attributes, forcing users to select the best fit preset to be applied for the image. Presets are directed to a set of fixed attributes that are applied in the same exact manner to every image selected, causing a photographer to have to implement additional and different adjustments to each image after a preset is applied. Another offering in the field is post production houses that employ people who provide manual image editing services. However, these people do not provide quality edits that adhere to the photographer's editing style, as achieving all those precise edits that a particular photographer desires is extremely onerous.

In practice, a professional photographer's editing style is a unique signature that contains numerous intricate and subtle implementations of image attribute adjustments. This editing style is very difficult for the photographer to fully articulate and communicate to another, forcing the photographer to spend a large amount of time and effort himself on image editing. In view of the above, a more efficient yet precise approach to computer-based image editing is desirable.

SUMMARY

The invention is directed to a sophisticated and intelligent computer-based image editing system that automatically applies edits to attributes of captured images in accordance with the preferences and editing style of any given user. The user can be a professional photographer. The user does not explicitly communicate editing instructions to the system. Rather, the system figures out what the user's style is by analyzing past examples of images edited by the user as well as by continuously taking note of any subsequent additional edits the user makes to computer-edited image results. With this invention, professional photographer users no longer need to devote the large amount of time and effort on manual image editing as is currently required.

Initial training of the automatic image editing system of the invention occurs as follows. The user provides or uploads sample image files of images he has already edited to his liking to the system. The provided image file contains two components: one is a raw image file and the other is a corresponding sidecar file of the edited image. The raw image file is the original captured image that is not altered, even when the user makes changes to the image with an image editing program. The corresponding sidecar file is a file containing metadata identifying image characteristics, properties, and edits to attributes of the image. The automatic image editing system analyzes at least this information to determine patterns of relationships related to attribute edits applied to images by this user.

At this point, the automatic image editing system is capable of automatically editing images in a manner consistent with how the user would have manually implemented those same edits. The user can now submit or upload one or more raw image files to the automatic image editing system for automatic editing of attributes by the system. The user receives back from the system a sidecar file generated by the system for each raw image file the user submitted for editing. The sidecar files contain metadata indicating how particular attributes of the image should be edited. To view the resulting computer-edited image, the user opens the sidecar file with an image viewing or editing program.

Further training of the automatic image editing system occurs anytime the user implements further manual edits to the computer-edited image. This feedback occurs so that the automatic image editing system can further refine its understanding of the user's preferences and style or continuously adjust to the user's changing style. When a user implements any manual attribute change to a computer-edited image, the sidecar file generated by the automatic image editing system is edited by the image editing program to capture that adjustment. The automatic image editing system detects such change and pulls a copy of the subsequently edited sidecar file so that the automatic image editing system can incorporate these additional changes to its dynamic learning of the user's preferences and style.

The invention effectively implements automatically those image attribute edits the user would have manually done himself. The automatic image editing system is intelligent, dynamic, and efficient.

BRIEF DESCRIPTION OF THE DRAWINGS

The invention may be understood by referring to the following description and accompanying drawings that are used to illustrate embodiments of the invention.

DETAILED DESCRIPTION

Figure 1:
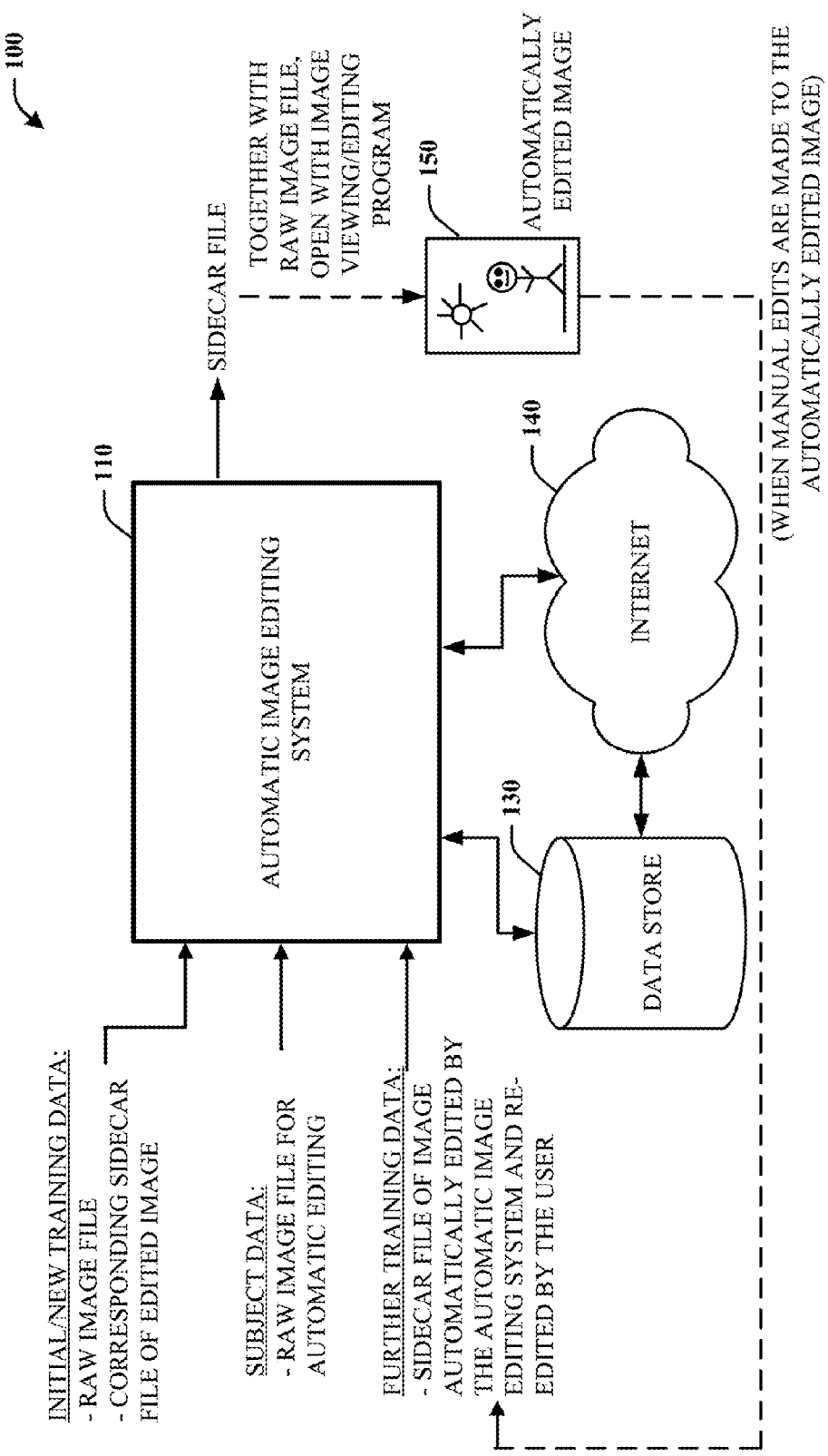
FIG. 1 illustrates an overview of an exemplary automatic image editing system according to one embodiment of the invention.

In the following description, numerous specific details are set forth. However, it is understood that embodiments of the invention may be practiced without all the details. In other instances, well-known circuits, connections, structures and techniques have not been shown in detail in order not to obscure the understanding of this description.

References in the specification to "one embodiment" or "an embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to combine aspects of more than one embodiment whether or not explicitly described. Use of the terms "instance," "example," and "exemplary" are only examples to enhance understanding of the description, but it should not be implied that the invention is only limited to these examples. Various block diagram elements labeled as modules or components are labeled in that manner for purposes of description and understanding, however these elements can be split or combined while still retaining the purpose of the invention. Accordingly, the entire system may reside remotely from the user at one or more locations or on a cloud. Portions of the system may reside locally on a user's computer.

The techniques shown in the figures can be implemented using code and data stored and executed on one or more electronic devices (e.g., an end station, a network element, etc.). Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. One or more parts of an embodiment of the invention may be implemented using different combinations of software, firmware, and/or hardware.

FIG. 1 illustrates an overview of an exemplary automatic image editing system according to one embodiment of the invention 100. Included is an automatic image editing system 110 that communicates with a data store 130 and the Internet 140. The automatic image editing system 110 receives various types of data as input. When the input is a type of training data, the automatic image editing system 110 utilizes that input to train itself. When the input is subject data, the automatic image editing system 110 utilizes that input to produce and output a sidecar file.

Reference to an "image" or "image file" in this specification refers to, for example, a photographic image captured by a digital camera and viewable with an image viewing program and the resulting image file that contains the photographic image, respectively. However, it is noted that the invention can be applied to image files of a non-photographic image, such as a digital drawing or a hand drawing in digital form. Yet further, the invention can be applied to broken down individual frames of a video, which is composed of a continuous sequential set of images.

To begin training an automatic image editing system 110, one type of input to the automatic image editing system 110 is initial/new training data. This type of data includes a raw image file and its corresponding sidecar file of an image previously edited by a user for initial training of the automatic image editing system 110. In one embodiment, the automatic image editing system 110 extracts only information from raw image files and sidecar files desired for processing. For an exemplary configuration in which processing is done at a location different from that of the user, only extracted information is transmitted over a network.

A raw image file (source file) is an unprocessed computer file that is created when an image is created, such as by taking a picture or digitally scanning a physical paper or item. The specific type and format of a raw image file depends on the apparatus, e.g., camera or scanner, that captured the image. Examples of raw image file formats are CR2 for CANON, NEF for NIKON, DCR, K25, and KDC for KODAK, ORF for OLYMPUS, RW2 for PANASONIC, and ARW, SRF, and SR2 for SONY. A raw image file can include a header, camera sensor metadata, image properties metadata, an image thumbnail or reduced-size image in JPEG format, a frame identifier in the case of videos, and image data. Metadata can be in exchangeable image file format, i.e., "Exif" format. A sidecar file corresponding to the captured image and raw image file is a computer file created by an image editing program when the user edits the image, e.g., by applying a preset or filter, cropping the image, individually adjusting the temperature, tint, etc. A sidecar file may also be referred to as a "buddy file" or "connected file." The sidecar file contains metadata about the captured image as well as metadata identifying the edits made by the user to the captured image. The specific type and format of a sidecar file depends on the image editing program used by the user to edit or view the captured image. For example, a sidecar file can be in the International Organization for Standardization (ISO) standard format of EXTENSIBLE METADATA PLATFORM (XMP) and its data arranged in a particular order for ADOBE LIGHTROOM and ADOBE PHOTOSHOP. A sidecar file includes metadata that can identify at least the following information: the camera's make and model that captured the original image, image dimensions (original or adjusted), and all adjustments to attributes of the image by the user, e.g., temperature, tint, exposure, highlights, whites, blacks, shadows, contrast, saturation, vibrance, and hue (red, orange, yellow, etc.).

The aforementioned inputs to the automatic image editing system 110 provide data to the automatic image editing system 110 to learn the user's image editing style. The automatic image editing system 110 applies a number of multi-variable calculations to identify relationships among aspects of the image causing user-applied edits to the images, as well as any relationships among the edits with each other. Furthermore, the automatic image editing system 110 does not only utilize data directly input via the raw image file and the sidecar file to formulate the relationships, but also processes that data to create manipulated data that provides further information from which to form relationships with user-applied edits to image attributes. Training of the automatic image editing system 110 can utilize resources residing in the data store 130 and on the Internet 140. The data store 130 can also query and extract information from the Internet 140. For example, the data store 130 can include a set of universally-applied analysis tools that process input data. In another example, the Internet 140 can provide the automatic image editing system 110 and/or the data store 130 with weather information at the location and day/time a photograph was taken.

Inputting more sets of raw image files and corresponding sidecar files to the automatic image editing system 110 provides the automatic image editing system 110 with more information about the user's image editing style. When the automatic image editing system 110 has more information about the user's image editing style, the more accurate the automatic image editing system 110 will be to implement the user's image editing style on future images. The number of edited images initially input to reasonably train the automatic image editing system 110 to predict acceptable edits to attributes of future images varies based on numerous factors, such as the variety of types of scenes and the strength of the user's editing style. For example, a professional photographer user who provides system training examples only of a beach scene at sunset may be very satisfied with the automatic editing results from a trained system 110 of his future photographs also taken at the beach at sunset. By contrast, if that professional photographer user then requests editing of photographs taken inside a dark church, the system 110 may be less confident in predicting edits that adhere to this specific user's editing style (as compared to predicting edits for the beach photographs) due to the absence of user-provided training examples similar to an indoor scene.

Another type of input to the automatic image editing system 110 is subject data. Subject data refers to data input to the automatic image editing system 110 when the user desires automatic editing of his images consistent with his image editing style. Normally, a professional photographer user spends hours manually editing images captured in a photoshoot. The automatic image editing system 110 saves this user the time he would have spent on this task. The term "manually" is used herein to refer to actions originating from a user's interaction with an image editing program/tool rather than from the automatic image editing system 110.

Subject data comprises a raw image file from which the automatic image editing system 110 automatically applies edits to attributes of the captured image. The automatic image editing system 110 utilizes the relationships established in the initial training phase to intelligently determine the specific manner in which attributes of the image(s) would have been edited by the user. These predictions can take into account information from the data store 130 and the Internet 140 in a consistent manner as utilized during initial training When the automatic image editing system 110 predicts such attribute edits, the automatic image editing system 110 creates a sidecar file (output in the block diagram of FIG. 1) for each raw image file received by the automatic image editing system 110 from the user. As described above, a sidecar file is a file typically created by an image editing program to set forth how attributes of an image displayed by a raw image file are edited by a user. The sidecar file allows the user to save his image alterations and open and view the edited image at a subsequent time. This invention directly creates such sidecar file. Specifically, rather than an image editing program creating a sidecar file based on edits manually applied by a user, the present invention of the automatic image editing system 110 predicts such edits that would have been manually applied, creates a sidecar file, and directly populates the sidecar file with those edits. The automatic image editing system 110 does not need to use an image editing program to create a sidecar file. The newly created sidecar file is the file that corresponds to the original raw image file; the automatic image editing system 110, rather than an image editing program, creates, populates, and outputs this sidecar file.

Upon output by the automatic image editing system 110 of the sidecar file, the user can open the raw image file and newly generated sidecar file pair with either an image viewing program or an image editing program. An image viewing program and/or an image editing program can be provided by the automatic image editing system 110. Alternatively, these programs can be separate from the automatic image editing system 110. Another option is that the automatic image editing system 110 can include an image viewing program, but not an image editing program. It is noted that opening the raw image file and sidecar file pair to view the edited image is optional, as indicated by the dotted arrow. These programs enable a user to view the images with attribute edits already applied 150 by the automatic image editing system 110, however the user need not be forced to visually review the edited images. If the user is using an image editing program for the viewing, the user then has the option to make additional edits manually to attributes of the automatically edited image. Possible reasons for such refinement or adjustment to attributes of an automatically edited image can be insufficient information contained in the initial training data set and/or the user changing his image editing style. As will be described next, when these additional edits are manually implemented by the user, they are communicated back to the automatic image editing system 110 in a feedback loop for further training of the automatic image editing system 110.

It thus follows that yet another type of input to the automatic image editing system 110 is further training data. Further training data refers to additional information provided to the automatic image editing system 110 subsequent to the initial training data to further refine or adjust the automatic image editing system's 110 understanding of the user's image editing style.

Further training data comprises a sidecar file corresponding to an image already automatically edited by the automatic image editing system 110 and further edited by the user at a later time. More particularly, when the user opts to further edit an automatically edited image by manually adjusting attributes to the already edited image using an image editing program, the same sidecar file that was created by the automatic image editing system 110 is altered by the image editing program to reflect the additional changes. In one example, the automatic image editing system 110 edits the tint attribute (among many attributes) of the image to have a value of +2, but the user, upon viewing the edited image, does not like the tint. The user then uses an image editing program to adjust the tint to have a value of +4. The image editing program utilized by the user to make this adjustment thus amends the content of the already existing sidecar file to indicate in metadata that the tint value is +4 rather than +2. The sidecar file amended by the image editing program is then fed back into the automatic image editing system 110. Metadata within the sidecar file identifies which raw image file the sidecar file corresponds to; resubmitting the raw image file is unnecessary. The automatic image editing system 110 then incorporates new information from the sidecar file to further understand the user's editing style. Analogous to the initial training of the automatic image editing system 110, further training of the automatic image editing system 110 with this additional information can use resources in the data store 130 and the Internet 140.

Figure 2:
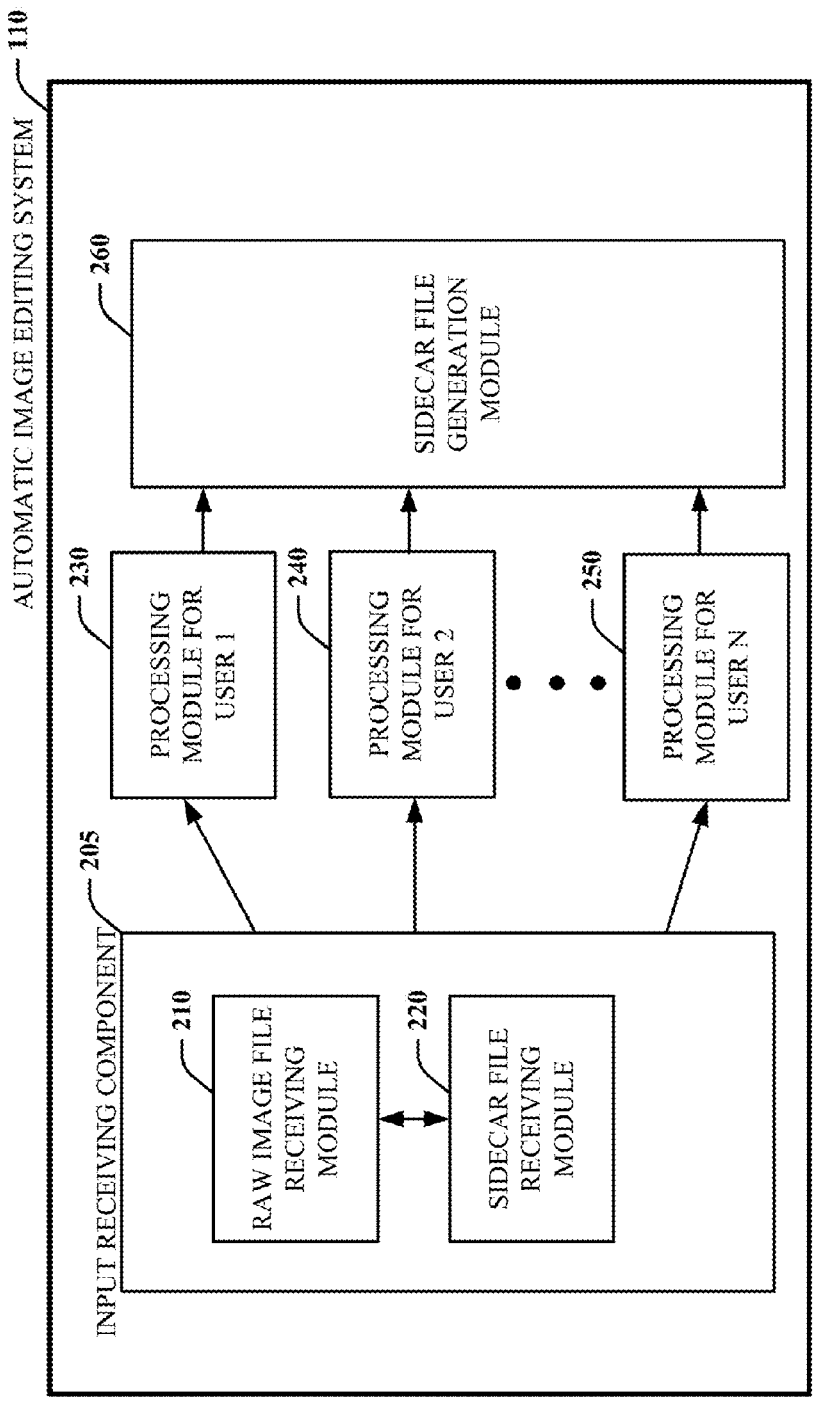
FIG. 2 depicts an exemplary block diagram of the automatic image editing system of FIG. 1 according to one embodiment of the invention.

FIG. 2 depicts an exemplary block diagram of the automatic image editing system of FIG. 1 according to one embodiment of the invention. The automatic image editing system 110 includes an input receiving component 205, a processing module for each user 230, 240, 250, and a sidecar file generation module 260. The input receiving component 205 includes a raw image file receiving module 210 and a sidecar file receiving module 220 in communication with each other. While all elements of the automatic image editing system 110 can reside in one location, e.g., locally on the user's computer or remotely on a server or cloud, the system 110 can be configured such that each element can reside in different locations. For example, the input receiving component 205 can reside locally on the user's computer while the processing modules 230, 240, 250 and the sidecar file generation module 260 reside on a remote computer. In another example, the input receiving component 205 and the sidecar file generation module 260 can reside locally on the user's computer while the processing modules 230, 240, 250 reside on one or more remote computers.

The input receiving component 205 of the automatic image editing system 110 receives inputs from a user, analyzes for and extracts information from those inputs, and routes the information to appropriate destinations. The input receiving component 205 of the automatic image editing system 110 receives two types of inputs: raw image files and sidecar files. The input receiving component 205 includes a raw image file receiving module 210 to accommodate raw image file inputs and a sidecar file receiving module 220 to accommodate sidecar file inputs. The raw image file receiving module 210 receives inputs when the user provides the system 110 with examples of his image editing style for initial training of the system 110 and when the user is using the system 110 to automatically edit attributes of his images consistent with his image editing style. The sidecar file receiving module 220 receives inputs when the user provides the system 110 with examples of his image editing style for initial training of the system 110 and when the user manually applies further edits to an image that has already been automatically edited by the system 110 for further training of the system 110.

In other words, when the automatic image editing system 110 is being initially trained to learn a user's image editing style, the raw image file receiving module 210 and the sidecar file receiving module 220 receives raw image files and corresponding sidecar files, respectively. Now that the automatic image editing system 110 is trained to apply the user's image editing style, the raw image file receiving module 210 receives new raw image files from the user when the user desires to have those raw unedited images edited by the system 110. Out of those raw image files provided by the user for editing and subsequently edited by the system 110, when the user applies additional edits to system-edited images, the sidecar file receiving module 220 acquires the resulting sidecar files. The sidecar file receiving module 220 can automatically collect these resulting sidecar files without requiring a user command. Furthermore, since the raw image file receiving module 210 and the sidecar file receiving module 220 are in communication with each other, the sidecar file receiving module 220 can look up which raw image file previously received by the raw image file receiving module 210 corresponds to these additionally edited sidecar files. Therefore, the raw image file receiving module 210 does not need to receive files it already received at a previous point in time.

Upon the input receiving component 205 receiving files, the input receiving component 205 then analyzes for and extracts information from the received files. For raw image files, the input receiving component 205 extracts features, which are inputs for each of the analytical models that predict each attribute edit in the images. These features include data identifying contrast, saturation, sharpness, ISO speed, focus type, ISO speed ratings, aperture value, shutter speed value, focal length, auto exposure setting, color tone, auto focus, white balance, sensor red/blue level, measured color, lens model, raw pixel values (thumbnail image), and all metadata available in the file related to the image, such as camera model, serial number, date, time, and GPS coordinates. As noted above, raw image files exist in a variety of different file types, e.g., CR2, NEF, etc., thus the features may vary. Moreover, as technology advances, raw image files may include additional aspects not presently listed, but those features should also be extracted from the raw image files and utilized as additional inputs to the analytical models for image edit predictions.

For sidecar files, the input receiving component 205 extracts attributes, which are aspects of an image that can be adjusted to alter the appearance of the image. These attributes include temperature, tint, exposure, highlights, whites, blacks, shadows, contrast, saturation, vibrance, and hue (red, orange, yellow, etc.). Sidecar files exist in a variety of languages and formats and can include different attributes; the aforementioned list of attributes is one example. Additional attributes can be adjusted, such as a Gaussian edit can be applied to a portion of a photographic image to remove the appearance of a blemish from a person's face. Blemish aspects are further discussed in connection with FIG. 3B.

The input receiving component 205 routes information obtained from the received files, i.e., features from raw image files and attributes from sidecar files, to one of multiple processing modules 230, 240, 250. Each processing module is dedicated to an individual and unique user of the system 110, i.e., user 1, user 2, through user N. Accordingly, the input receiving component 205 routes information related to a user to the processing module assigned to him. The processing modules 230, 240, 250 are responsible for analytical processing directed to learning image edits consistent with their respective user's image editing style.

In an alternative embodiment, the input receiving component 205 routes information instead to a central location for analytical model building and training After the model is built and trained with a user's individual image editing style, that model can then be copied to a processing module 230, 240, 250 reserved for that user. As the analytical model adjusts to additional editing changes as those changes are fed back to the processing module, those adjustments can be implemented in the analytical model at the user's processing module.

In another embodiment, the input receiving component 205 forwards the raw image files and sidecar files in their entireties to their respective user's processing module 230, 240, 250 and the processing module 230, 240, 250 extracts the information it needs.

When a processing module 230, 240, 250 receives information from the input receiving component 205, how the module 230, 240, 250 proceeds depends on what type of information is received. The processing module 230, 240, 250 receives three categories of inputs that trigger an event directed to either training (learning a user's image editing style) or predicting (intelligently predicting image edits according to the user's image editing style). First, when the processing module 230, 240, 250 receives raw image file information, i.e., features, bundled with corresponding sidecar information, i.e., attributes, then the processing module 230, 240, 250 performs initial training of itself based on the received information. During initial training, the processing module 230, 240, 250 identifies sophisticated relationships among the features and attributes extracted from the files and creates an analytical model. Second, when the processing module 230, 240, 250 receives raw image file information, i.e., features, by itself, then the processing module 230, 240, 250 performs automatic image editing prediction. During image editing prediction, the processing module 230, 240, 250 utilizes the analytical model created during initial training to predict what particular edits to various attributes of an image would be desired by the user. Finally, when the processing module 230, 240, 250 receives sidecar file information, i.e., attributes, by itself, then the processing module 230, 240, 250 performs further training of itself based on the received information. Further training refers to the processing module 230, 240, 250 adjusting its previously created analytical model to take into account this additional feedback information. Training and predicting are the analytical capabilities of the system 110 that reside in the individual user processing modules 230, 240, 250.

It is noted that each of the processing modules 230, 240, 250 are highly individualized for its respective users. However, a pre-populated processing module can be implemented for users who do not wish to or cannot utilize their own style. In one embodiment, this model is fixed, i.e., additional changes made by the user are not fed back to refine the model. In this situation, the system 110 can utilize one processing module for multiple users as user-originated changes are not imposed on the processing module, i.e., the module is read-only. In another embodiment, the model is used as a starting point, i.e., additional changes made by the user are fed back to adjust the model. For example, an amateur photographer who does not have an editing style may have the option of choosing another editing style. In this case, the system 110 maintains a processing module for each user as subsequent changes will be written to the processing module and if more than one user shares a module, the changes will be applied to all users sharing the module. There may be another case where multiple users desire to share a writeable module as members of a group. For example, a group of professional photographer users who collaborate in a business may want to maintain the same editing style for all users and therefore share one writeable processing module. In the event that a user chooses an editing style that is not his own, it is noted that each attribute edit that the system 110 applies to an image will still be deliberately and carefully chosen for that particular image. The same edits are not blindly imposed on every image as would be the case if a preset or filter was used.

The processing modules 230, 240, 250 are in communication with a sidecar file generation module 260. However, the processing modules 230, 240, 250 do not necessarily transmit data to the sidecar file generation module 260 for every processing event. When the processing modules 230, 240, 250 are engaged in a training event, the information received is kept within the processing modules 230, 240, 250 to perfect their respective analytical models. The system 110 does not provide an output to the user during training events as the analytical models stay with the system 110. On the other hand, when the processing modules 230, 240, 250 are engaged in a prediction event, the user expects an output from the system 110, i.e., an image that is automatically edited according to his style. To achieve this output, the system 110 generates a sidecar file. More specifically, when the processing modules 230, 240, 250 complete their predictions of how attributes of an image should be edited, the processing modules 230, 240, 250 transmit these predictions to the sidecar file generation module 260. The sidecar file generation module 260 arranges the received predictions into a newly created sidecar file in a format acceptable to an image viewing or editing program. The sidecar file generation module 260 outputs this sidecar file to the user.

Figure 3A:
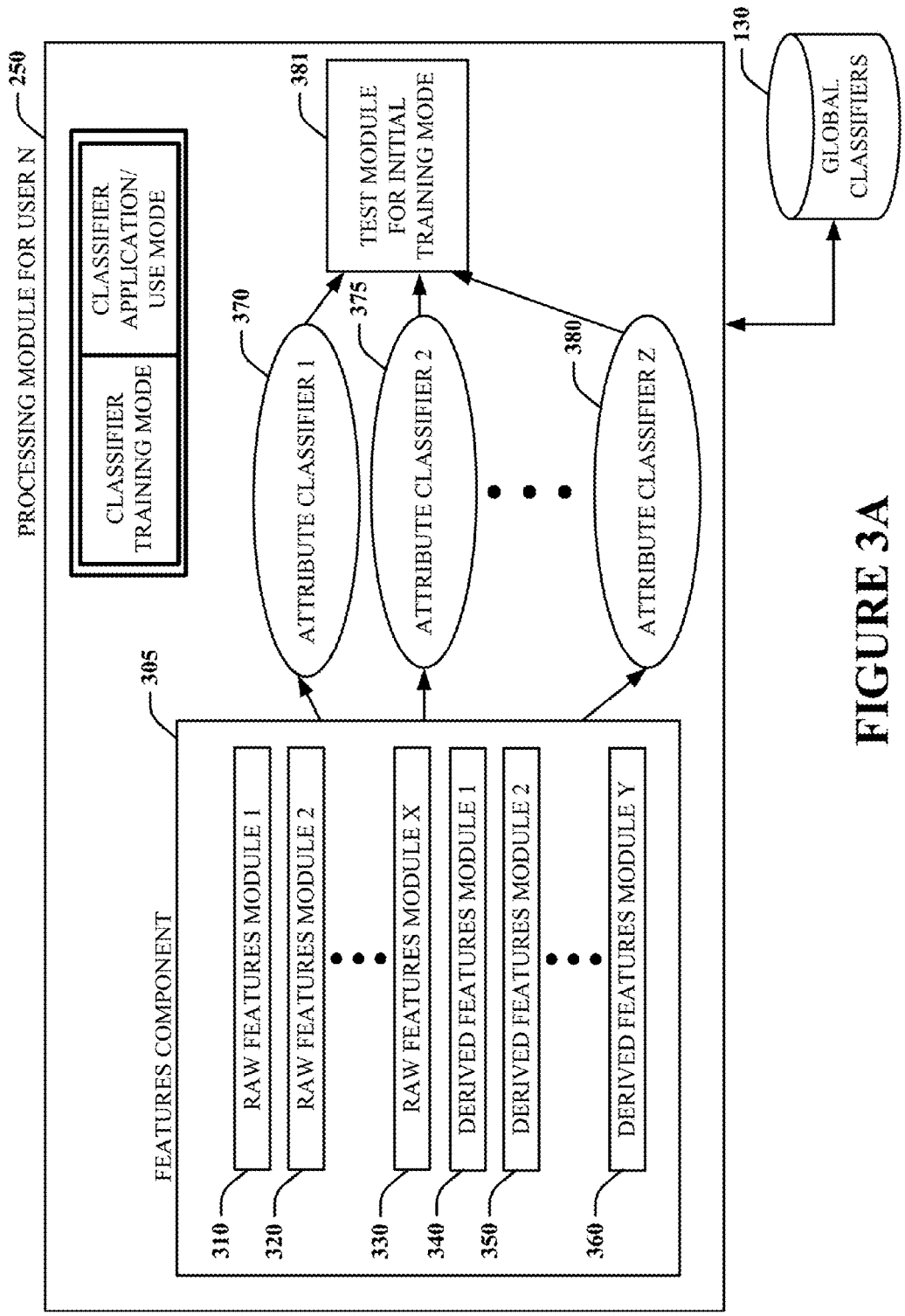
FIG. 3A is an exemplary block diagram of the processing module for user N of FIG. 2 according to one embodiment of the invention.

FIG. 3A is an exemplary block diagram of the processing module for user N of FIG. 2 according to one embodiment of the invention. The processing module for user N 250 operates in two modes: classifier training mode and classifier application/use mode. The processing module for user N 250 includes a features component 305 having multiple raw features modules 310, 320, 330 and multiple derived features modules 330, 340, 360. Also included in the processing module for user N 250 are multiple attribute classifiers 370, 375, 380, and a test module for initial training mode 381. The processing module for user N 250 communicates with a global classifiers data store 130.

Classifiers are analytical models that receive features as inputs and identify conclusions based on those features. One example of a classification algorithm is RANDOM FORESTS. Processing module 250 contains one classifier per attribute adjustable in an image (attribute classifiers 370, 375, 380).

Classifier training mode refers to the mode in which the processing module 250 receives information to train its various attribute classifiers 370, 375, 380. For training, features from raw image files and attributes from sidecar files are extracted and transmitted to attribute classifiers 370, 375, 380. Attribute classifiers 370, 375, 380 identifies relationships among those elements. Each attribute classifier 370, 375, 380 is dedicated to one image attribute. A list of adjustable attributes is identified in a sidecar file and dictated by the image viewing/editing program selected by the user or the system 110 to view or edit the image. The number of classifiers is therefore determined by said list. For example, attribute classifier 1 370 can be a classifier for the temperature attribute, attribute classifier 2 375 can be a classifier for the tint attribute, and additional classifiers can be dedicated to predicting edits of each of exposure, highlights, whites, blacks, shadows, contrast, saturation, vibrance, and hue (red, orange, yellow, etc.), among additional adjustable and supported attributes. After all the attribute classifiers 370, 375, 380 build their respective classifiers based on all the initial training files provided by the user, the analytical models within the attribute classifiers 370, 375, 380 are complete and ready to be utilized for prediction. The attribute classifiers 370, 375, 380 are also in communication with each other to identify any relationships among the attributes. Whenever further training information is provided to the processing module 250, the further adjusted attributes contained in the sidecar file is fed back to the appropriate classifiers for further refinement of their respective analytical models. Real time adjustment to the attribute classifiers 370, 375, 380 occurs as feedback is received by the system 110, i.e., adjustment by a user to one image can be taken into consideration by the attribute classifiers 370, 375, 380 for subsequent image edit predictions within the same photoshoot. It is not necessary for the system 110 to gather all revised sidecar files in a set prior to initiating further training and refinement of the attribute classifiers 370, 375, 380. As soon as the system 110 detects one sidecar file as revised, the system 110 can initiate its further training immediately.

Test module for initial training mode 381 is an optional module that determines the confidence level of each trained attribute classifier's ability to predict their respective attributes. This determination is made by setting aside a subset of raw image file and sidecar file pairs from the entire submitted group of initial training files. After the attribute classifiers 370, 375, 380 have completed training on all the initial training files except for the subset set aside, the test module 381 utilizes those trained attribute classifiers 370, 375, 380 to run a test prediction on those raw images that were held back. The test module 381 requests the resulting sidecar files from the test and compares those test generated sidecar files with the actual sidecar files that were held back. For a 100% fully confident classifiers, the test generated sidecar files would be identical to the held back actual sidecar files in content. In other words, the predicted outcomes of attribute edits would match the actual attribute edits. A tolerance range can be set for each attribute, where deviations in predictions that fall within a certain range of the actual desired edits can be so indiscernible to the user's eye that they are considered successful predictions by the system 110.

Classifier application/use mode refers to the mode in which the processing module 250 is called upon to predict and apply attribute edits to unedited images submitted by a user. When the processing module 250 receives only raw image files or information extracted from raw image files, the processing module 250 switches to classifier application/use mode. Raw image file information is transmitted to the features component 305. The features component 305 includes a raw features module 310, 320, 330 for each raw feature extracted from raw image files. Raw features are aspects obtained directly from raw image files. For example, raw features module 1 310 can correspond to contrast, raw features module 2 320 can correspond to saturation, and additional raw features modules each corresponding to sharpness, ISO speed, focus type, ISO speed ratings, aperture value, shutter speed value, focal length, auto exposure setting, color tone, auto focus, white balance, sensor red/blue level, measured color, lens model, raw pixel values (thumbnail image), and all metadata available in the file related to the image, such as camera model, serial number, date, time, and GPS coordinates. The features component 305 also includes a derived features module 340, 350, 360 for each derived feature corresponding to a raw image file. Derived features are aspects arrived at upon analysis or query based on one or more raw features of a raw image file. For instance, derived features module 1 340 can query the national weather service over the Internet for the cloud conditions at the date/time and location (GPS coordinates) that the image was taken. Date, time, and GPS coordinates are raw features; cloud conditions is a derived feature based on the aforementioned three raw features.

Yet another set of inputs to the attribute classifiers 370, 375, 380 includes the outputs from the global classifiers data store 130. The global classifiers data store 130 determines and outputs additional derived features from raw features of raw image files. Rather than a limited step query or analysis as utilized by derived features modules 340, 350, 360, global classifiers obtain derived features with a multivariable analytical classifier model.

Upon receipt of all the inputs obtained from the features component 305 and the global classifiers data store 130, attribute classifiers 370, 375, 380, now trained for a particular user, produce predictions of edits for each respective attribute of each image. It is noted that many varieties of images may be submitted for edit prediction. The attribute classifiers 370, 375, 380 place greater weight on training and predicting edits for image types similar to each other. For instance, predictions related to photographs taken on cloudy days are based on empirical examples of photographs also taken on cloudy days, rather than photographs taken on sunny days. This is because photographers edit photographs taken on cloudy days differently from photographs taken on sunny days. For a more specific example, photographers adjust the white balance attribute (temperature and tint) for photographs taken indoors differently from photographs taken outdoors. Identifiers can be flagged for such differences to assist a white balance attribute classifier in making a more accurate prediction of the white balance edit for a particular photograph.

Figure 3B:
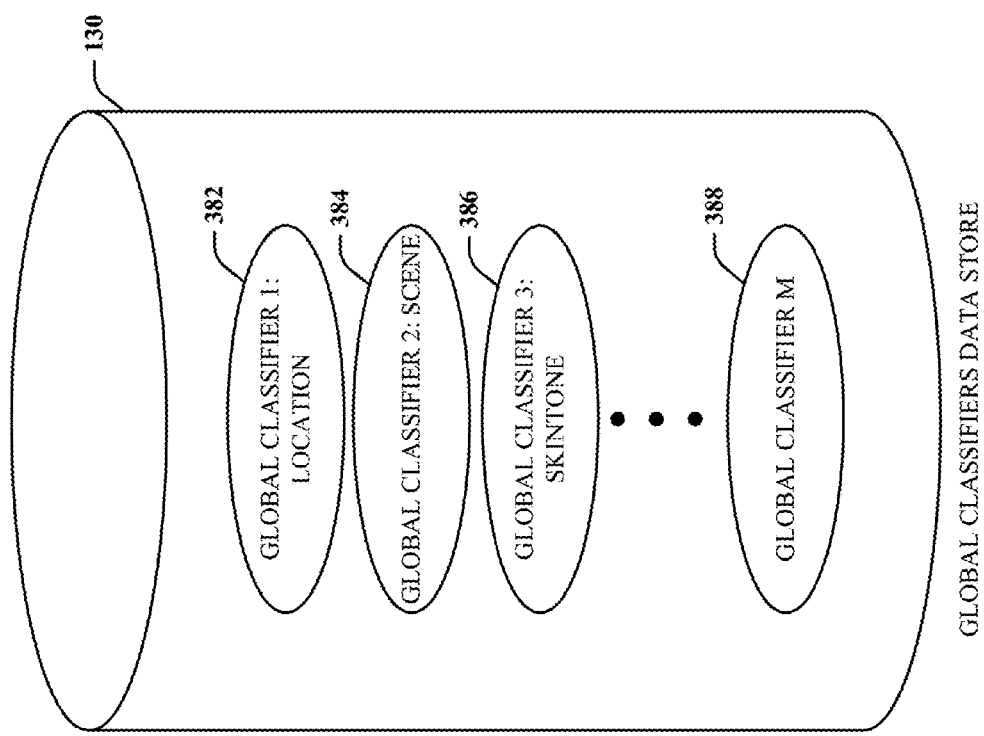
FIG. 3B is an exemplary block diagram of the global classifiers data store of FIGS. 1 and 3A according to one embodiment of the invention.

FIG. 3B is an exemplary block diagram of the global classifiers data store of FIGS. 1 and 3A according to one embodiment of the invention. Global classifiers data store 130 contains various global classifiers, i.e., global classifier 1: location 382, global classifier 2: scene 384, global classifier 3: skintone 386, and global classifier M 388.

Each global classifier 382, 384, 386, 388 outputs a derived feature that is transmitted as inputs to the attribute classifiers 370, 375, 380 of FIG. 3A. Global classifier 1 382 identifies a location, global classifier 2 384 identifies a scene, global classifier 3 identifies one or more skintones, and global classifier M 388 is reserved for another analytical classifier model to determine another derived feature to input to the attribute classifiers 370, 375, 380.

Global classifier 1: location 382 identifies a location of the image. Location type can influence how an image is edited. The location classifier 382 queries satellite maps over the Internet to determine a location type at the location (GPS coordinates) that the image was taken. Location types can comprise a type of region or scene, e.g., the beach, inside a building, on the street, at the park, in the forest, in an urban location, etc. Location classifier 382 can be configured to identify in more detail the region or scene, i.e., not only that the image was taken in the forest, but specifically under a tree. GPS coordinates is the raw feature extracted from the raw image file from which location classifier 382 determines the derived feature of location type. Location type is thus a derived feature output by the location classifier 382 that is provided as an input to the attribute classifiers 370, 375, 380.

Global classifier 2: scene 384 identifies a particular scene of the image. Scene type can influence how an image is edited. The raw feature that is input into the scene classifier 384 is a thumbnail image (raw pixel values) extracted from the raw image file. The thumbnail image is used rather than the full raw image file because the size of the thumbnail image is substantially smaller than the raw image file and provides sufficient information to identify the scene type of the image. Alternatively, a preview image may be used instead of a thumbnail image. A preview image is a scaled down version of the raw image stored in the raw image file. A preview image takes more memory space than a thumbnail but less than the raw image. For instances where memory usage is not of concern, the raw image itself may be used. Scene classifier 384 uses an analytical model that identifies a scene type based on analysis of the thumbnail image. A scene type may identify the type of background of the image. Examples of scene types are a beach, a park, a church, a field, an urban setting/buildings, a forest/trees, a horizon, etc. In one embodiment, scene type training occurs with manual selection of scene options, performed by people. Scene type is a derived feature output by the scene classifier 384 that is provided as an input to the attribute classifiers 370, 375, 380.

Global classifier 3: skintone 386 identifies the skintone of each subject in the image. Skintone of the subjects can influence how an image is edited. The same input for the scene classifier 384 is transmitted to the skintone classifier 386. The skintone classifier 386 receives a thumbnail image or preview image input and uses an analytical model to identify the skintone of each subject that appears in the thumbnail image. Examples of skintones are pale Caucasian, tan Caucasian, African, Hispanic, Asian, Indian, Middle Eastern, etc. In one embodiment, skintone type training occurs with manual selection of skintone options, performed by people. Skintone is a derived feature output by the skintone classifier 386 that is provided as an input to the attribute classifiers 370, 375, 380.

In one example, global classifier M 388 can detect and identify specific skin blemishes or imperfections on human subjects captured in an image. In one embodiment, a blemish classifier 388 receives a thumbnail image or preview image (or the full image itself) and uses an analytical model to identify imperfection types and where these imperfections are located in the image. These imperfections can include acne, wrinkles, moles, scars, and freckles on a person's skin. In one embodiment, initial skin imperfection identification training occurs with examples of manual identification of imperfections, performed by people. Imperfection identification is a derived feature output by the global classifier M 388 that is provided as an input to the attribute classifiers 370, 375, 380. For instance, once this information is received, one of the attribute classifiers may be dedicated to visually removing the identified imperfections from the image, e.g., through the aforementioned Gaussian edit in the style of the user. In another embodiment, blemish removal can be offered to or implemented for users regardless of whether their image editing styles include blemish removal approaches.

In yet another example, there may be an additional classifier dedicated to identifying facial expressions of human subjects in an image. A user photographer may have a specific style where he prefers to apply certain edits based on facial expressions. This facial expression classifier receives a thumbnail image or preview image (or the full image itself) and uses an analytical model to identify the facial expression of each human subject in the image. For example, facial expressions may be smiling, laughing, frowning, surprised, crying, etc. In one embodiment, initial facial expression identification training occurs with examples of manual identification of facial expressions, performed by people. Facial expression identification is a derived feature output by the global classifier M 388 that is provided as an input to the attribute classifiers 370, 375, 380. As an example, a black and white attribute classifier trained with a user photographer's style may convert images to black and white when at least one subject in the image is laughing. In another example, a image cropping attribute classifier trained with a user photographer's style may crop or tilt an image when at least one subject in the image is crying. It is noted that one image editing category can be applied to multiple situations. For example, a user may have a default style of cropping his images to a square, but when the processing module 250 detects an exception in the user's image editing style of cropping to a 16:9 landscape rectangle for images containing crying subjects, an attribute classifier would cover both the default and the exception. The processing module 250 acts to mimic a user's image editing style.

Figure 4:
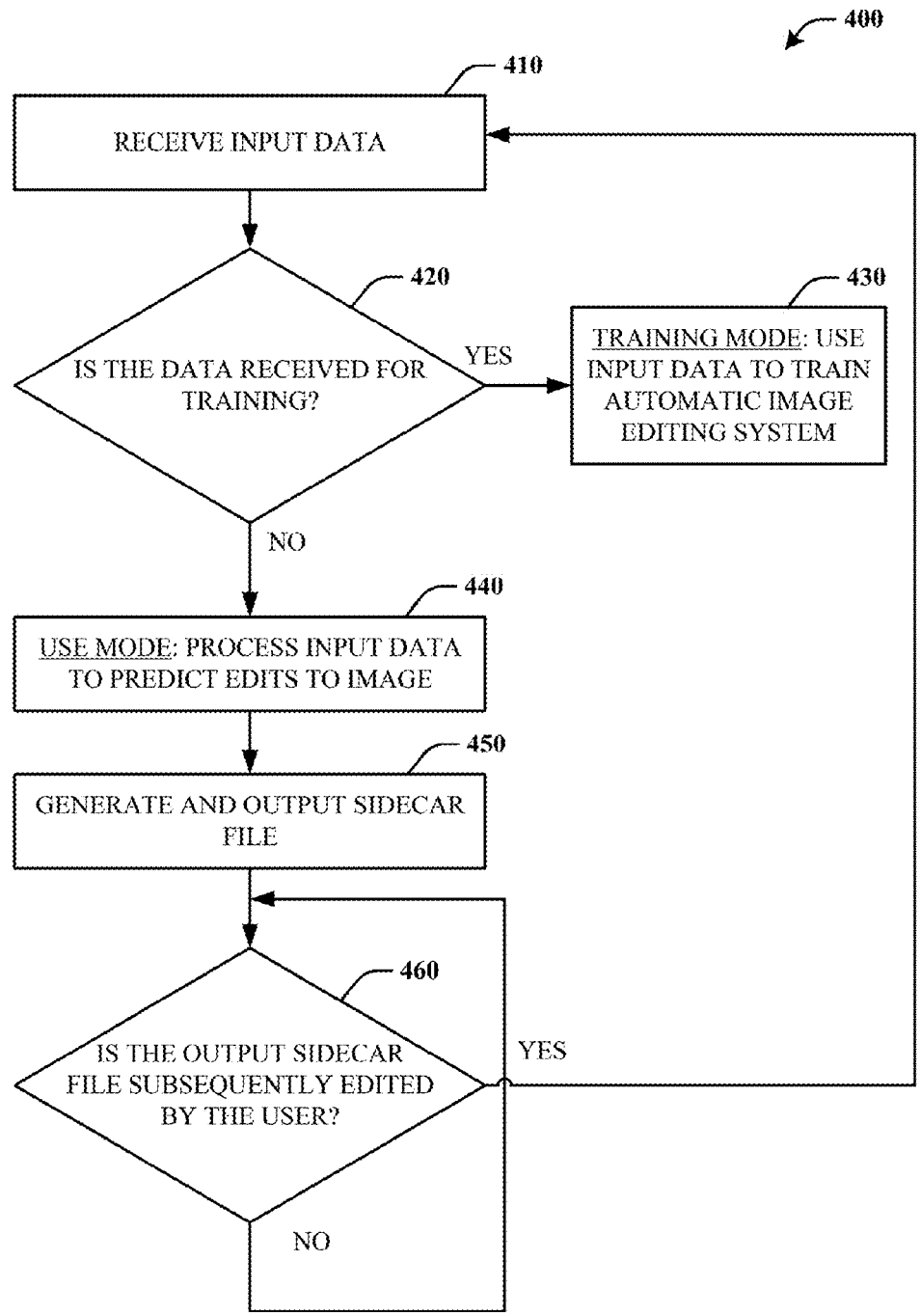
FIG. 4 presents a flow diagram of an automatic image editing system according to one embodiment of the invention.

FIG. 4 presents a flow diagram of an automatic image editing system according to one embodiment of the invention. The operations of FIG. 4 will be described with reference to the exemplary embodiments of FIGS. 1-3B. However, it should be understood that the operations of flow diagrams can be performed by embodiments of the invention other than those discussed with reference to FIGS. 1-3B, and the embodiments discussed with reference to FIGS. 1-3B can perform operations different than those discussed with reference to the flow diagrams. For this and all flow diagram figures, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

The method 400 begins at 410, where the system receives input data. The system behaves differently based on what type of data is receives. Accordingly, a determination is made whether the data received is for training purposes, including initial training and further training/refinement 420.

If the system determines that the data is received for training, the system uses the received data to train its prediction models 430. The system determines that initial training is desired when sets of raw image files and corresponding sidecar files of already edited images are received. The system is triggered to perform further training/refinement when only sidecar files are received, indicating that these are sidecar files were originally system-generated and have been further amended to identify additional manual edits by the user.

If the system determines that the data is not received for training, the system processes the received data to predict edits of attributes in the images 440. The system determines that prediction is desired when the input received comprises only raw image files. Upon prediction of all attribute edits in an image, the system generates and outputs a sidecar file for each received image 450. The sidecar file identifies every edit to the attributes in an image.

The system detects whether any of its previously created and output sidecar files have been amended 460. A sidecar file is amended when the user makes manual adjustments to images already automatically edited by the system. If the system detects that a sidecar file has been amended, then system acquires a copy of the amended sidecar file 410. The feedback loop around 460 indicates that an amended sidecar file can occur at any time and therefore be detected at any time, e.g., days, months, or years after the system performs the initial prediction and creates the original sidecar file.

Figure 5:
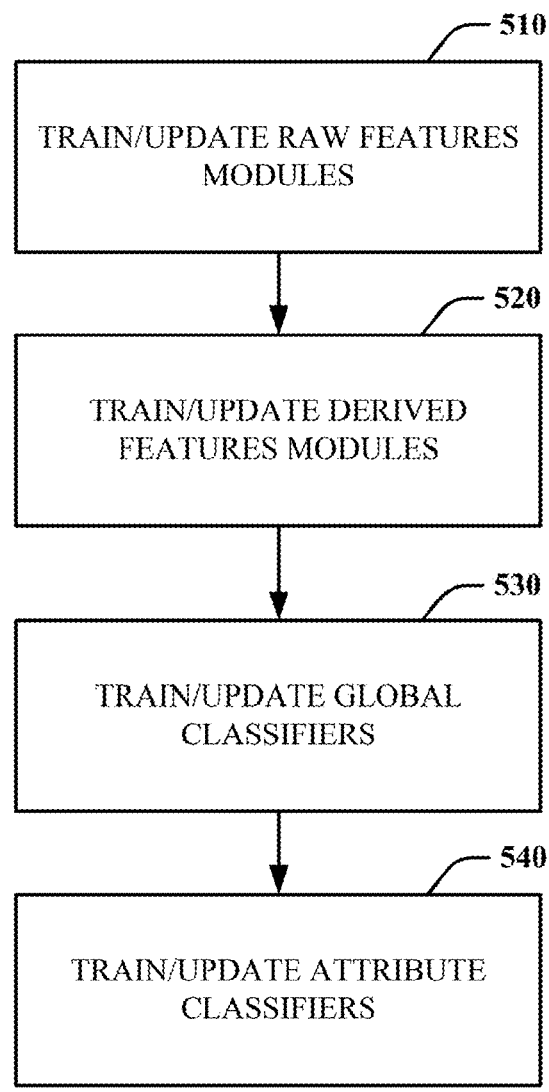
FIG. 5 illustrates a flow diagram of training mode aspects of an automatic image editing system according to one embodiment of the invention.

FIG. 5 illustrates a flow diagram of training mode aspects of an automatic image editing system according to one embodiment of the invention. The training mode aspects expand on block 430 of FIG. 4. The operations of FIG. 5 will be described with reference to the exemplary embodiments of FIGS. 1-3B. However, it should be understood that the operations of flow diagrams can be performed by embodiments of the invention other than those discussed with reference to FIGS. 1-3B, and the embodiments discussed with reference to FIGS. 1-3B can perform operations different than those discussed with reference to the flow diagrams.

In training mode, the system acquires and analyzes data to be able to accurately predict and apply a user's image editing style. Training mode occurs to initialize the system and prepare it for prediction and use. Training mode also occurs to update the system with additional information received at some time after the system is initialized, e.g., after a prediction is made by the system and that result is adjusted by the user. Beginning at 510, raw features modules are populated with raw features from raw image files for training Raw features are inputs into global classifiers and attribute classifiers. Continuing to 520, derived features modules are populated by receiving raw features and performing at least one processing step on the raw features to create derived features. Derived features are inputs into attribute classifiers. Then at 530, the global classifiers are populated with raw feature inputs from the raw features modules or raw image files. Global classifiers build analytical models to evaluate raw feature inputs to arrive at derived feature outputs. Finally in training mode, attribute classifiers are populated with raw feature inputs received from raw features modules, derived feature inputs received from derived feature modules, and global features/derived feature inputs received from global classifiers 540. Attribute classifiers build analytical models to evaluate all the aforementioned inputs to create predictions of image attribute edits consistent with the user's image editing style. For example, for a given photograph, if a user would have edited the tint attribute to be +5, a trained attribute classifier for tint will be able to make that prediction. It is noted that +5 is merely an example of a specific image editing program's tint value that is identified in metadata of the sidecar file. For another image editing program, a tint of +5 may, for example, numerically correspond to +0.5.

Figure 6:
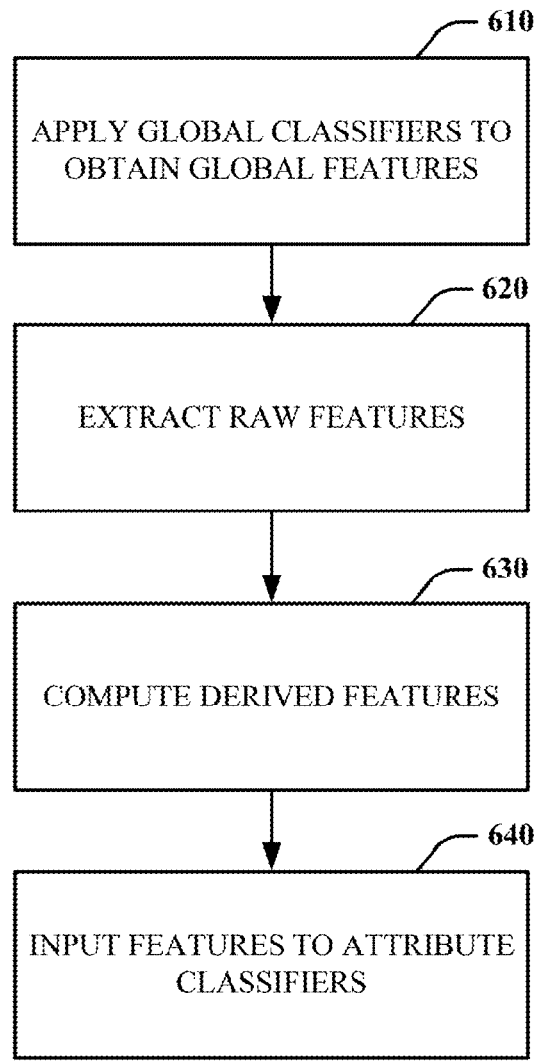
FIG. 6 depicts a flow diagram of use mode aspects of an automatic image editing system according to one embodiment of the invention.

FIG. 6 depicts a flow diagram of use mode aspects of an automatic image editing system according to one embodiment of the invention. The use mode aspects expand on block 440 of FIG. 4. The operations of FIG. 6 will be described with reference to the exemplary embodiments of FIGS. 1-3B. However, it should be understood that the operations of flow diagrams can be performed by embodiments of the invention other than those discussed with reference to FIGS. 1-3B, and the embodiments discussed with reference to FIGS. 1-3B can perform operations different than those discussed with reference to the flow diagrams.

Use mode refers to when a user supplies the system with raw image files and uses the system to predict and apply edits to the images corresponding to the raw image files. From the user's perspective, the user submits raw image files, unedited images, the system performs processing, and upon completion, the user is able to view in an image viewing/editing program, automatically edited images. Beginning with 610, one of three types of features is gathered. Global classifiers are applied to raw features to obtain global/derived features. At 620, the second of three feature types is extracted. Raw features are extracted directly from raw image files. At 630, derived features are computed based on raw features. A multitude of features are input to the attribute classifiers 640. These features are the global/derived features from 610, the raw features from 620, and the derived features from 630. When these inputs are received by the attribute classifiers, image editing predictions are made 440.

Figure 7:
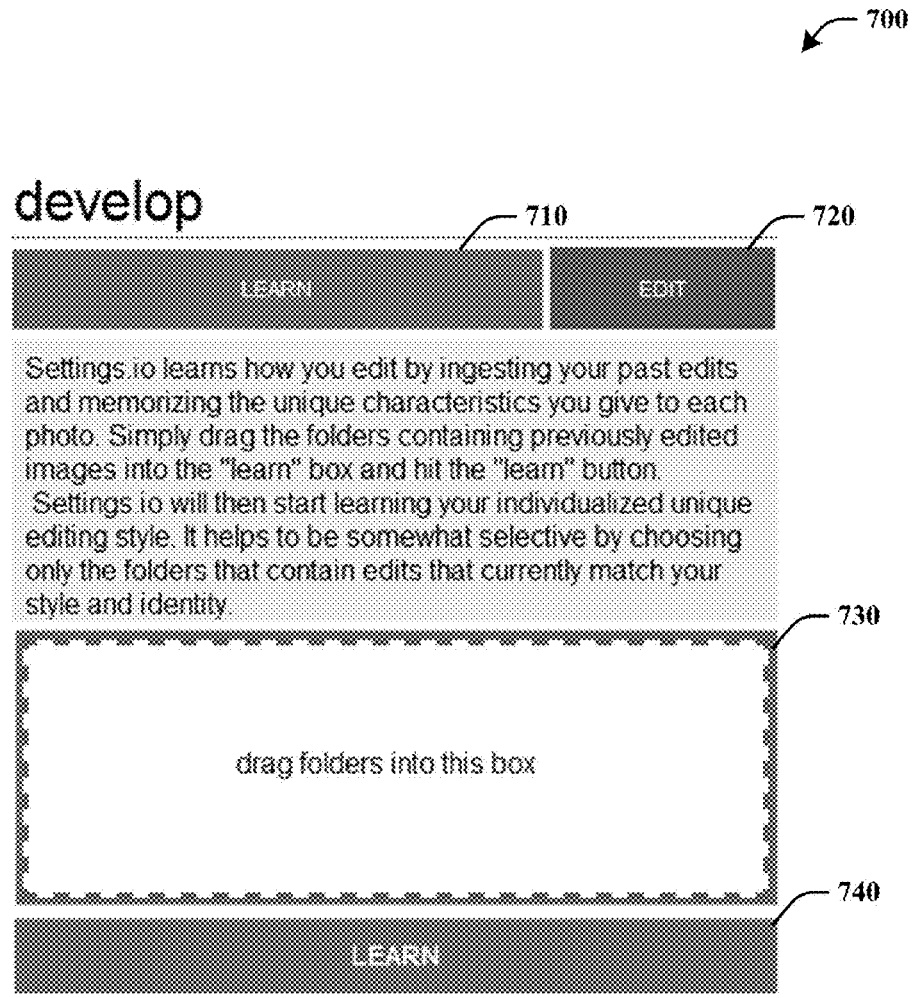
FIG. 7 is a graphical user interface of an automatic image editing system in training view according to one embodiment of the invention.

FIG. 7 is a graphical user interface of an automatic image editing system in training view according to one embodiment of the invention. This graphical user interface depicts the automatic image editing system in training mode 700. In training mode, the system obtains information from the user about the user's style. More specifically, the user only needs to provide the system with examples of already edited images. These files should be provided at least upon first use of the system, and can optionally be provided at any subsequent time. The user does not need to describe in words what his image editing style is.

At the top, the interface 700 depicts buttons that identify which mode the system is in. The user can select the "learn" button on the left 710 to upload sample edited images and the user can select the "edit" button on the right 720 to use the system to automatically edit unedited images. The "learn" button 710 is currently selected; the interface is in training mode.

To upload sample edited images, the user drags specific image files and/or folders containing image files to the upload space 730. After the user has provided all the image files and/or folders containing image files by dragging them into the upload space 730, the user selects the execution button 740 labeled "learn" below the upload space 730. In another embodiment, the system automatically uploads all files dragged into the upload space 730 rather than offering an execution button 740. By performing these acts, the user has provided the system all the information it needs to learn the user's image editing style. It is also noted that the upload space 730 may be substituted by a selection space in the embodiment where the images are not processed remotely, but instead processed locally on the user's computer, as set forth above.

It is noted that there are no deliberate options for resubmitting information related to a user's subsequent adjustment of a system-edited image. This is because the system automatically detects and acquires this information without any additional act from the user.

Figure 8:
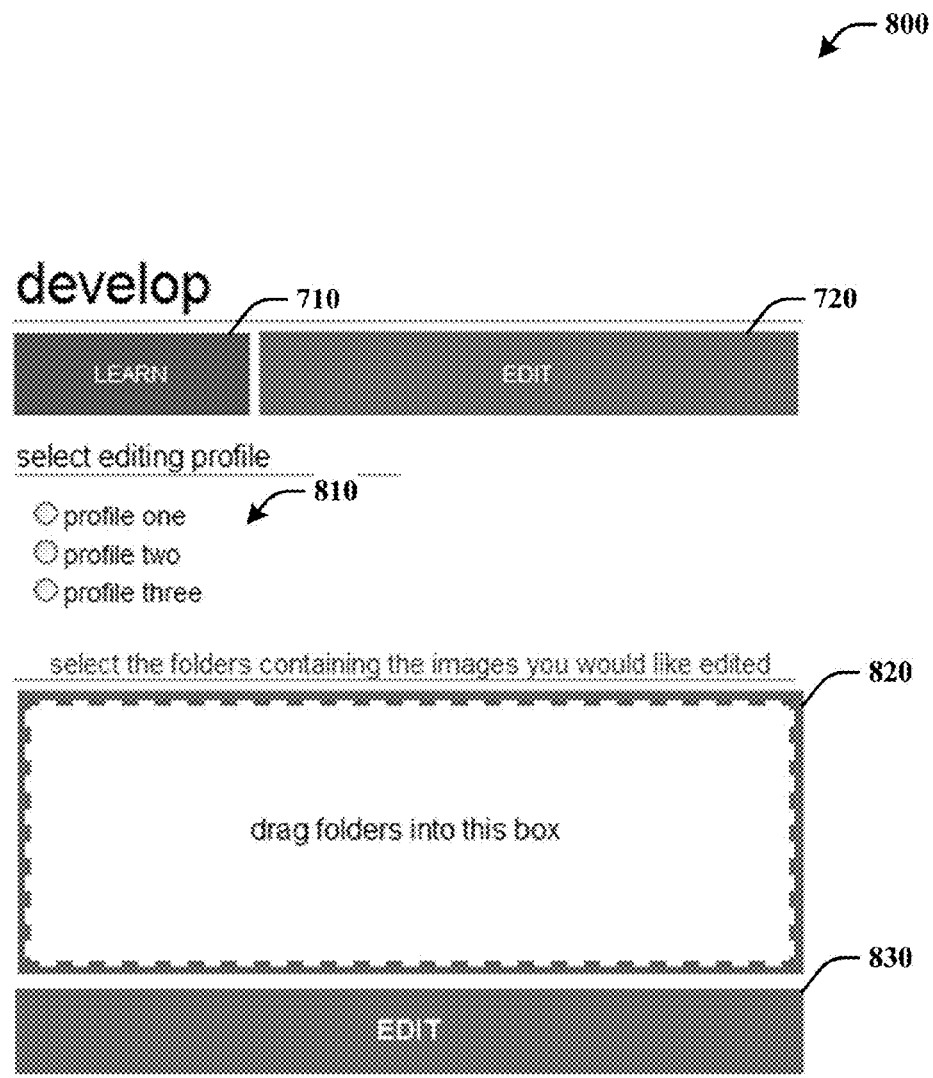
FIG. 8 depicts a graphical user interface of an automatic image editing system in use view according to one embodiment of the invention.

FIG. 8 depicts a graphical user interface of an automatic image editing system in use view according to one embodiment of the invention. This graphical user interface depicts the automatic image editing system in use mode 800. In use mode, the system receives unedited raw image files from a user that the user desires to be automatically edited.

This interface 800 also depicts the same buttons as interface 700 that identify which mode the system is in, the "learn" button 710 and the "edit" button 720. The "edit" button 720 is currently selected, indicating that the system is in use mode.

Similar to training mode identified in FIG. 7, the user interacts with an upload space 820. To provide images to the system for editing, the user uploads raw image files and/or folders containing raw image files by dragging them to the upload space 820. A user may have multiple editing style profiles available to him; the profile to be used is selected by the selection buttons 810 identifying profile one, profile two, and profile three. After one of the selection buttons 810 is marked and the raw image files are provided in the upload space 820, the user selects the execution button 830 labeled "edit" below the upload space 820. In another embodiment, the system automatically uploads and edits all raw image files as they are dragged into the upload space 820 rather than offering an execution button 830.

The system then populates one or more folders with newly created sidecar files. The user may choose to view these system-edited images with an image editing program. In another embodiment, the system automatically displays edited images to the user as soon as the edits have been applied to the images.

While the invention has been described in terms of several embodiments, those skilled in the art will recognize that the invention is not limited to the embodiments described, can be practiced with modification and alteration within the spirit and scope of the appended claims. The description is to be regarded as illustrative instead of limiting.

What is claimed is:

1. An automatic image editing method comprising:
   receiving a sample edited image that has already been adjusted from an original non-edited image;
   training a computer-implemented image editing system based at least in part on patterns of relationships between adjustments in the sample edited image, wherein the computer-implemented image editing system does not receive the original non-edited image for training;
   receiving a first raw image file from a user;
   generating a first sidecar file identifying a first predicted edit to one or more attributes of a first image corresponding to the first raw image file, wherein the first predicted edit to the one or more attributes of the first image is predicted based on first information extracted from the first raw image file analyzed by the computer-implemented image editing system that has been trained; and
   creating a computer-adjusted image based on the first sidecar file.

2. The automatic image editing method of claim 1, further comprising:
   opening the first sidecar file with an image viewing program to display the first image with the first predicted edit to the one or more attributes imposed.

3. The automatic image editing method of claim 1, further comprising:
   receiving a second raw image file from the user; and
   generating a second sidecar file identifying a second predicted edit to one or more attributes of a second image corresponding to the second raw image file, wherein the second predicted edit to one or more attributes of the second image differs from the first predicted edit to the one or more attributes of the first image.

4. The automatic image editing method of claim 1, wherein an attribute in the one or more attributes is temperature or tint.

5. The automatic image editing method of claim 1, wherein the first predicted edit to the one or more attributes of the first image is predicted based on examples of other images previously edited by the user.

6. The automatic image editing method of claim 3, wherein the first predicted edit to the one or more attributes of the first image and the second predicted edit to the one or more attributes of the second image adhere to an image editing style of the user that varies per scene.

7. The automatic image editing method of claim 1, wherein the first image is a photograph.

8. The automatic image editing method of claim 1, wherein an attribute in the one or more attributes is exposure.

9. An automatic image editing method comprising:
   receiving a set of sample edited images that have already been adjusted from their respective original non-edited images;
   training a computer-implemented image editing system based on patterns of relationships between adjustments in the sample edited image, wherein the computer-implemented image editing system does not receive the original non-edited images for training;
   receiving a first raw image file from a user:
   generating a first sidecar file identifying a first predicted edit to an attribute of a first image corresponding to the first raw image file, wherein the first predicted edit to the attribute of the first image is predicted based on first information extracted from the first raw image file analyzed by the computer-implemented image editing system that has been trained;
   creating a first computer-adjusted image based on the first sidecar file;
   receiving a second raw image file from the user;
   generating a second sidecar file identifying a second predicted edit to an attribute of a second image corresponding to the second raw image file, wherein the second predicted edit to the attribute of the second image is predicted based on second information extracted from the second raw image file analyzed by the computer-implemented image editing system that has been trained, wherein the attribute of the first image and the attribute of the second image are the same, wherein the first image and the second image are of a same scene, and wherein the first predicted edit to the attribute of the first image and the second predicted edit to the attribute of the second image are not the same; and
   creating a second computer-adjusted image based on the second sidecar file.

10. The automatic image editing method of claim 9, wherein the attribute is exposure.

11. The automatic image editing method of claim 9, wherein the attribute is tint.

12. The automatic image editing method of claim 9, wherein the attribute is temperature.

13. An automatic image editing method comprising:
   receiving a set of sample edited images that have already been adjusted from their respective original non-edited images;
   training a computer-implemented image editing system based at least in part on patterns of relationships between adjustments made to exposure, tint, and temperature in the set of sample edited images, wherein the computer-implemented image editing system does not receive the original non-edited images for training;

receiving a first raw image file from a user;

generating a first sidecar file identifying a first intelligent edit to an exposure value of a first image corresponding to the first raw image file, wherein the first intelligent edit to the exposure value of the first image is predicted based on information extracted from the first raw image file analyzed by the computer-implemented image editing system that has been trained;

creating a first computer-adjusted image adjusted by exposure based on the first sidecar file;

receiving a second raw image file from the user;

generating a second sidecar file identifying a second intelligent edit to an exposure value of a second image corresponding to the second raw image file, wherein the second intelligent edit to the exposure value of the second image is predicted based on information extracted from the second raw image file analyzed by the computer-implemented image editing system that has been trained; and creating a second computer-adjusted image adjusted by exposure based on the second sidecar file, wherein the first image and the second image are of a same scene, and wherein the first computer-adjusted image and the second computer-adjusted image exhibit different exposures due to differences in the first intelligent edit and the second intelligent edit.

14. The automatic image editing method of claim 13, further comprising:

receiving a manual edit of the first computer-adjusted image from the user; and further training the computer-implemented image editing system with the manual edit.

15. The automatic image editing method of claim 13, wherein the computer-implemented image editing system comprises a plurality of classifiers, one of which is dedicated to exposure prediction.

16. The automatic image editing method of claim 13, wherein the first sidecar file identifies an edit to a first temperature value different from an edit to a second temperature value of the second sidecar file.

17. The automatic image editing method of claim 13, wherein the first sidecar file identifies an edit to a first tint value different from an edit to a second temperature value of the second sidecar file.

18. The automatic image editing method of claim 13, further comprising:

predicting the first intelligent edit to the exposure value of the first image corresponding to the first raw image file and the second intelligent edit to the exposure value of the second image corresponding to the second raw image file based on patterns of a multivariable relationship among at least exposure, tint, and temperature adjustments made to each sample edited image in the set of sample edited images, wherein the patterns are detected by the trained computer-implemented image editing system.

* * * * *